Jan. 16, 1934.  H. P. TAYLOR  1,943,775
VEGETABLE CLEANSING AND BLANCHING APPARATUS
Filed Jan. 30, 1931  2 Sheets-Sheet 1
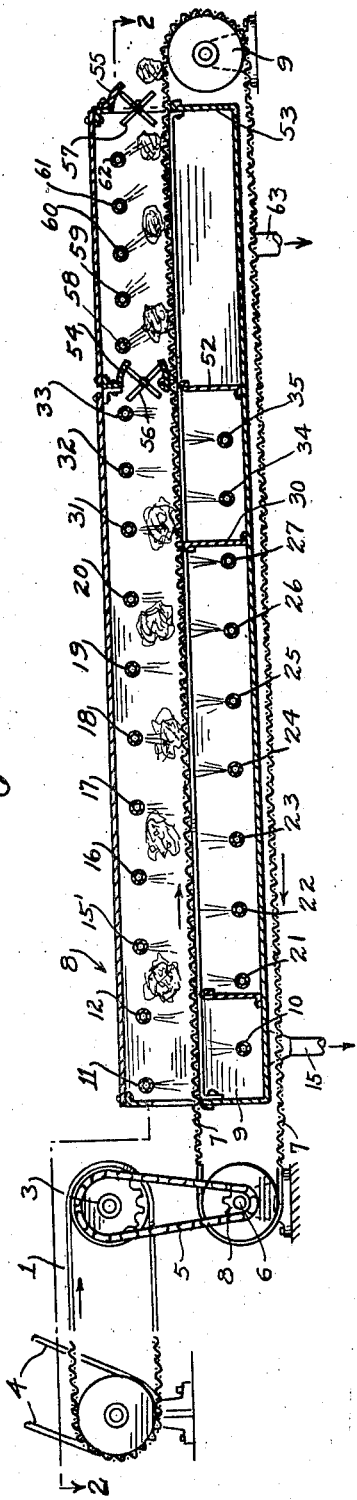
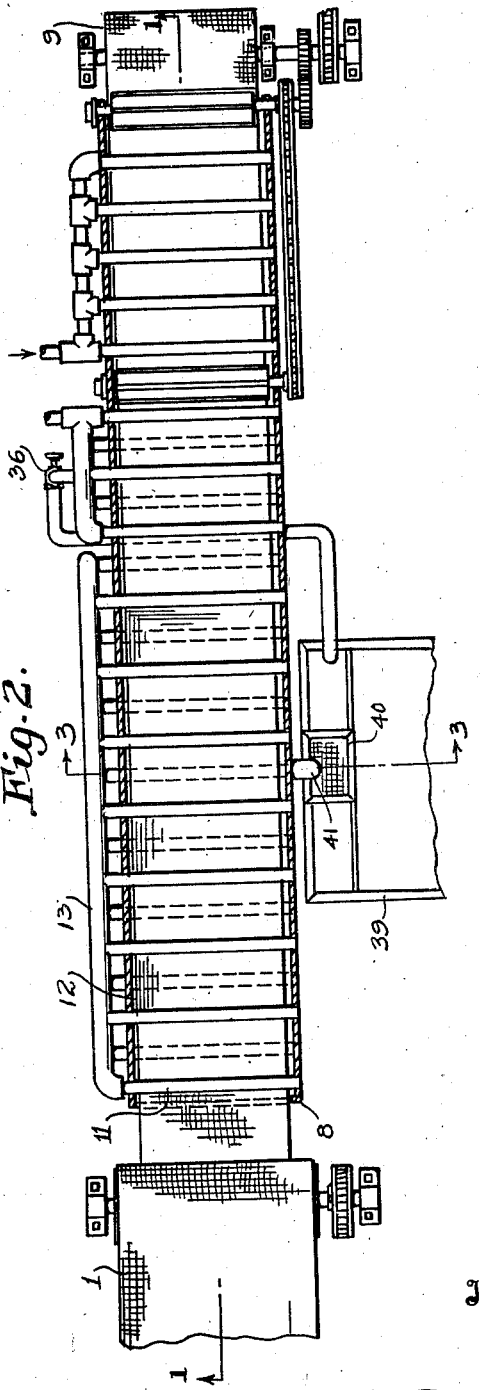
Inventor
Henry P. Taylor
By Mason Fenwick & Lawrence
Attorney Jan. 16, 1934. H. P. TAYLOR 1,943,775
VEGETABLE CLEANSING AND BLANCHING APPARATUS
Filed Jan. 30, 1931 2 Sheets-Sheet 2

Inventor.
Henry P. Taylor
By Mason Fenwick & Lawrence
Attorneys

Patented Jan. 16, 1934

1,943,775

UNITED STATES PATENT OFFICE 1,943,775

VEGETABLE CLEANSING AND BLANCHING APPARATUS

Henry Porterfield Taylor, Walkerton, Va.

Application January 30, 1931. Serial No. 512,362

1 Claim. (Cl. 146—194)

The invention forming the subject matter of this application is an apparatus designed for washing spinach, turnip greens and other similar light leafy vegetables, which have a large surface area to be cleaned in comparison with their cubic content, and which tend to bunch in relatively impervious masses while being washed; and for blanching these products in steam before the canning thereof without rehandling between the two operations.

The main object of the invention is to provide a vegetable washer designed to remove dirt from potatoes, turnips, beans, celery and other vegetables; to utilize part of the same cleaning water in the continuous operation of the machine, and to remove and settle dirt from this water before it is again used in the cleaning operation.

Another object of the invention is to provide conveyor mechanisms one of which moves at greater speed than the other, in order to procure a difference in relative spread of the vegetables on the two conveyors during their movements on the said conveyors.

Other objects of the invention will become apparent as the detailed description thereof proceeds.

In the drawings:

Figure 1 is a vertical longitudinal section of the apparatus taken on the line 1—1 of Figure 2.

Figure 2 is a fragmentary plan view of the apparatus taken on the line 2—2 of Figure 1.

Figure 3:
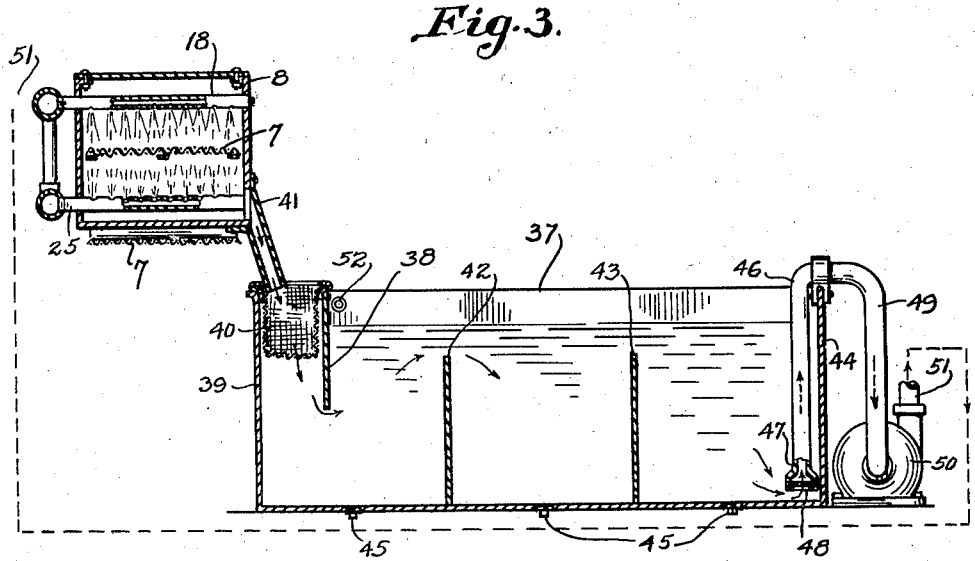
Figure 3 is a vertical transverse section taken on the line 3—3 of Figure 2.
Figure 4:
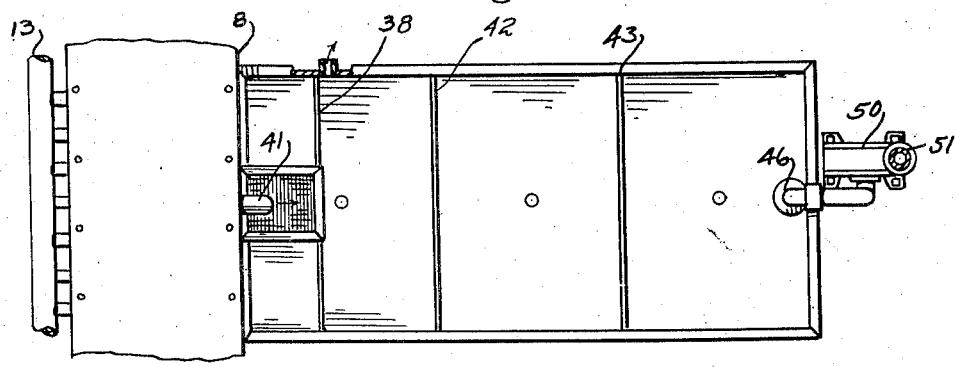
Figure 4 is a plan view of a settling tank and pumping apparatus employed for treating a mass of water, used repeatedly, for washing vegetables during their movement across and above the tank.

As shown in Figures 1 and 2 of the drawing, the apparatus comprises an endless conveyor belt 1, rotatably mounted on drums 2 and 3 of any suitable type. The drum 2 is rotated by means of the drive belt 4, and the movement of the drum 2 is transmitted by this belt to the drum 3; which, in turn, is connected by a sprocket chain 5 to a drive pinion 6 fixed to the end of a shaft journaled in suitable supporting mechanism for operating a conveyor mesh belt 7, suitably mounted on drums 8 and 9.

It is to be noted that the pinion 6 is much smaller than the drive gear on drum 3. This is to insure the movement of the conveyor belt 7 at greater speed than that of the conveyor belt 1. The belt 1 serves as a picking conveyor on which the vegetables to be cleaned are first dumped. The movement of this conveyor at comparatively slow speed permits a number of operators to be positioned along the conveyor in order to pick out large leaves and trash from the vegetables as they pass slowly along the picker conveyor toward the conveyor mesh belt 7.

It is obvious that when the hand picked vegetables reach the end of the conveyor 1, they are dumped onto the mesh belt 7; the greater speed of which causes a comparatively greater spread of the vegetables to subject them thoroughly to the cleansing action of the sprays between which the upper branch of the conveyor 7 travels.

As shown in Figure 1, the upper branch of the conveyor belt 7 travels centrally through a casing 8 which has a series of spray pipes spaced along said casing and arranged above the upper face of said conveyor. The casing 8 is also provided with a second series of spray pipes mounted in staggered relation with the first named series and below the upper branch of the conveyor 7.

Near the entrance of the belt 7 into the casing 8 there is located a hopper 9 designed to receive and to conduct from the casing 8, the dirty water resulting from the initial cleaning action of the apparatus on the vegetables as they enter the casing 8. Centrally of this hopper 9 and below the upper branch of the conveyor belt 7 there is located a spray pipe 10; and immediately above and on opposite sides of the spray pipe 10 there are two spray pipes 11 and 12 arranged so as to direct their sprays, alternately with the spray 10, on the vegetables at their entrance into the casing 8.

Figure 5:
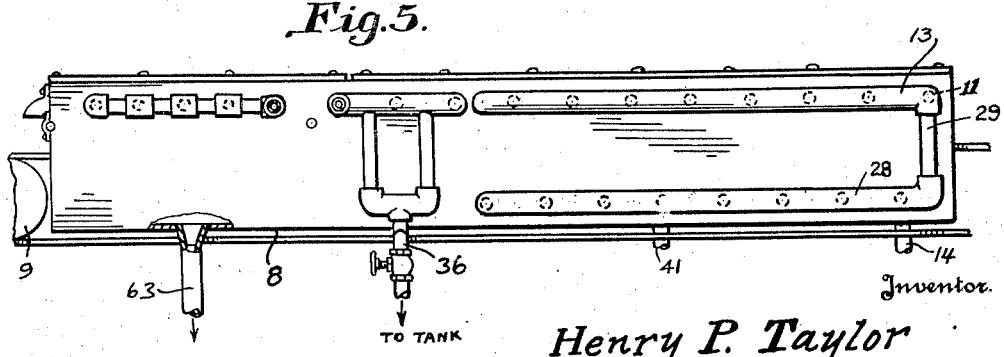
Figure 5 is a fragmentary rear end elevation of the water supply system for the apparatus.

These spray pipes 11 and 12 are connected to a manifold 13, and the spray pipe 10 is connected to the same manifold by a down pipe 14 (see Figure 5). The water from each of these spray pipes 10, 11 and 12 is conducted directly away from the casing 8 through the hopper 9 and an outlet pipe 15, and is not used again in the operation of this apparatus.

As the vegetables which have been subjected to the preliminary washing by the sprays 10, 11 and 12 move through the casing 8 on the upper branch of the conveyor belt 7, they become subjected to the washing action of spray pipes 15', 16, 17, 18, 19 and 20 which are also connected to the manifold 13. In staggered relation with these pipes, the spray pipes 21, 22, 23, 24, 25, 26 and 27 extend across and below the upper branch and extend from the manifold 28, connected by a down pipe 29 to the upper manifold 13. These sprays are operated with considerable force and cause a tumbling action of the vegetables on the upper branch of the conveyor 7 which separates and spreads the vegetables, and exposes every part of them to the cleansing action of the water sprayed through the pipes 15 to 27 inclusive.

A baffle plate 30 extends across the lower half of the casing 8 and below the upper branch of the conveyor belt 7 to separate that part of the casing which contains the spray pipes 15 to 27. Immediately to the right of the baffle plate 30, and above the upper branch of the conveyor belt 7 as seen in Figure 1, there is arranged a series of spray pipes 31, 32 and 33. Immediately below the upper branch of the belt 7 and in staggered relation with the spray pipes 31, 32 and 33 there are arranged the spray pipes 34 and 35. These spray pipes 31 to 35 inclusive are connected by a valve controlled pipe 36 to an independent source of water supply, the object of this part of the mechanism being to impose a final cleansing action by fresh clean water on the vegetables as they emerge from the cleansing action of the intermediate sprays from the pipes 15 to 27. The fresh water, after operation through the sprays 31 to 35, is conducted into the settling tank 37 in order to replenish the supply of water in said tank which is, as previously stated, used repeatedly through the spray pipes 15 to 27.

The tank 37 extends to one side of the conveyor belt washing and spraying mechanism as shown in Figures 2 and 3. This tank is provided at the end near the conveyor mechanism with a downwardly extending baffle plate 38 between which plate and the end 39 of the tank there is detachably supported a filter screen container 40 designed to trap the larger particles of trash and dirt from the water emerging from the casing 8 through the conducting pipe or spout 41.

The tank 37 is also provided with a series of transverse baffle plates 42 and 43 extending up from the bottom of the tank and designed to divide the tank into settling chambers for trapping dirt as the water flows from the inlet end 39 to the outlet end 44. Each of these chambers is provided in the bottom thereof with a plug 45 to facilitate removal of the sediment as it settles from the water flowing through the tank 37.

Suitably mounted at the end 44 of the settling tank there is an inverted U-shaped conduit having one branch 46 thereof extending downwardly into the tank and terminating at the bottom end in a head 47 provided with a removable screen 48. The branch 46 is connected to the branch 49 leading to the pump 50, which pumps water through the tank 37 and conducts it by pipe 51 to the inlet end of the manifold 13. The tank 37 is provided with an overflow 52 to conduct excess water away from the tank.

The cleansing operation, so far, comprises the preliminary operation by which the water from the sprays 10, 11 and 12 removes the greater part of the dirt and trash from the vegetables moved by the upper branch of the conveyor belt 7, the dirty water being conducted away from this part of the apparatus and not used again. The next set of sprays 15 to 27 utilizes the same water over and over again, replenished in part by water conducted from the fresh water sprays 31 to 35 into the settling tank 37.

It is common to subject many vegetables to the blanching action of steam prior to the canning of such vegetables. In order to effect this blanching economically the casing 8 is further divided by another baffle plate 52 which forms another wall of the fresh water spraying chamber. This baffle plate 52 is arranged below the upper branch of the conveyor belt 7 and forms with the end wall 53 of the casing 8 a blanching chamber in which the thoroughly cleansed vegetables are now subjected to the action of steam. Immediately above the baffle plate 52 and the end wall 53 of the casing 8 there is arranged the valve casings 54 and 55, in which are rotatably mounted the paddle valves 56 and 57 forming rotatable closures for the steam chamber to prevent, as much as possible, the waste of steam, and still permit the free passage of the vegetables on the upper branch of conveyor 7 through the aforesaid steam chamber.

The steam spray pipes 58, 59, 60, 61, and 62 are arranged transversely of the casing to direct their sprays at an angle to the traveling upper branch of the conveyor 7, so as to facilitate the travel of said upper branch with the vegetables thereon through the casing 8. The steam chamber is provided with a conduit 63 for conducting condensed moisture from said chamber and such waste matter as may have been blown from the cleaned vegetables by the action of the steam sprays.

To sum up: The apparatus comprises a slow moving picker conveyor on which the vegetables to be cleansed are first dumped and spread, so that the larger leaves and trash may be separated from the vegetable mass by picking operators arranged along the picker conveyor. A second conveyor connected for rotation by the first, and at greater speed, takes the hand-picked vegetables from the first conveyor and moves them through a washing and blanching chamber divided into sections; in one of which sections the greater part of the dirt is removed by water never used again. In another section the vegetables are subjected to a further and intermediate cleansing action of water forced through spray pipes and passing through a settling tank to be used repeatedly for the intermediate cleaning of vegetables. Next, the vegetables pass through a section in which fresh clean water is used to impart a final cleaning action to the vegetables, and which is conducted after use, to replenish the supply of water passing through the settling tank in the intermediate cleaning stage.

Finally, the vegetables pass from the water cleaning sections through a steam spray and blanching chamber which is controlled by paddle valves at each end to prevent waste of steam as much as possible. Then, the cleaned and blanched vegetables pass on to the canning machine, or wherever it may be desired to transport them for further use or processing.

While I have shown my invention as embodied in a particular form of apparatus, it must be distinctly understood that it is not to be limited to that particular form, but is to be considered and limited only by the scope of the claim appended hereto.

I claim:

In vegetable washing apparatus a horizontal endless openwork conveyor, means for moving said conveyor, a second horizontal openwork endless conveyor aligned with the first conveyor and having one end thereof located below one end of the first conveyor, means connecting the two conveyors to drive the second conveyor at a greater speed than the first, a horizontal casing through which the upper branch of the second conveyor moves, baffle plates extending across the casing below said upper branch and dividing the casing into three compartments, a settling tank for cleansing water, a manifold, a series of spray pipes extending from said manifold across the first and second compartments on opposite sides of the upper branch, means for forcing water from said tank to and through said manifold and spray pipes, a waste pipe for discharging water from the first compartment, means for returning water from the second compartment to the said tank, a series of spray pipes arranged across the third compartment on opposite sides of said upper branch, valve controlled means connecting said last named spray pipes with a fresh water supply main, and means for conducting water from the third compartment to said tank to replenish the supply therein as diminished by the discharge through said waste pipe.

HENRY PORTERFIELD TAYLOR.